(12) United States Patent
Zhang (10) Patent No.: US 12,515,727 B2
(45) Date of Patent: Jan. 6, 2026

(54) EXPANDABLE CART

(71) Applicant: Jinhua MFRH Leisure Products Co., Ltd., Jinhua (CN)

(72) Inventor: Xiangshan Zhang, Jinhua (CN)

(73) Assignee: Jinhua MFRH Leisure Products Co., Ltd., Jinhua (CN)

( * ) Notice: Subject to any disclaimer, the term of this patent is extended or adjusted under 35 U.S.C. 154(b) by 341 days.

(21) Appl. No.: 18/140,645

(22) Filed: Apr. 28, 2023

(65) Prior Publication Data

US 2024/0300561 A1    Sep. 12, 2024

(30) Foreign Application Priority Data

Mar. 6, 2023 (CN) .......................... 202310206034.5
Mar. 6, 2023 (CN) .......................... 202320398334.3
Mar. 6, 2023 (CN) .......................... 202320398335.8

(51) Int. Cl.
*B62B 3/02* (2006.01)
*B62B 3/00* (2006.01)
*B62B 5/06* (2006.01)

(52) U.S. Cl.
CPC .............. *B62B 3/025* (2013.01); *B62B 3/002* (2013.01); *B62B 3/007* (2013.01); *B62B 5/067* (2013.01); *B62B 2205/06* (2013.01)

(58) Field of Classification Search
CPC ..... B62B 2205/06; B62B 3/007; B62B 3/002; B62B 3/025; B62B 3/02
See application file for complete search history.

(56) References Cited

U.S. PATENT DOCUMENTS

| 1,771,836 A | * | 7/1930 | Beckham | B62B 3/02 280/35 |
| 2,049,683 A | * | 8/1936 | Baumgardner | B62B 3/02 248/129 |
| 2,059,320 A | * | 11/1936 | Dolge | B62B 3/02 27/27 |

(Continued)

FOREIGN PATENT DOCUMENTS

CN    115140138 A * 10/2022
GB      927014 A * 5/1963

*Primary Examiner* — Emma K Frick
(74) *Attorney, Agent, or Firm* — Bayramoglu Law Offices LLC (57) ABSTRACT

An expandable cart includes a lifting mechanism, and a first folding mechanism, a second folding mechanism, a third folding mechanism, and a fourth folding mechanism capable of being folded and contracted. The lifting mechanism includes a first telescopic column, a second telescopic column, a third telescopic column, and a fourth telescopic column arranged vertically and capable of telescoping. The first telescopic column, the second telescopic column, the third telescopic column, and the fourth telescopic column are rectangularly arranged at intervals, and the first folding mechanism, the second folding mechanism, the third folding mechanism, and the fourth folding mechanism are sequentially connected between two adjacent telescopic columns. The four telescopic columns are contracted to a shortest state and close to each other, thereby effectively reducing the folding volume of the expandable cart, and facilitating storage and carrying by a user.

12 Claims, 7 Drawing Sheets

(56) References Cited

U.S. PATENT DOCUMENTS

| | | | |
|---|---|---|---|
| 8,162,349 B1* | 4/2012 | Roselle | B62B 5/085 |
| | | | 280/654 |
| 9,056,621 B1* | 6/2015 | Jin | B62B 3/027 |
| 9,073,564 B2* | 7/2015 | Yang | B62B 3/002 |
| 9,409,665 B1* | 8/2016 | Gregory | A63B 47/00 |
| 9,738,298 B1* | 8/2017 | Yang | B62B 3/025 |
| 9,956,981 B1* | 5/2018 | Fitzwater | E04H 15/06 |
| 10,633,010 B1* | 4/2020 | Zhang | B62B 3/025 |
| 10,836,418 B2* | 11/2020 | Zhu | B62B 3/025 |
| 10,871,007 B1* | 12/2020 | Tsai | E04H 15/50 |
| 10,953,903 B1* | 3/2021 | Park | B62B 3/007 |
| D929,063 S * | 8/2021 | Zhang | D34/12 |
| 11,173,936 B1* | 11/2021 | Regev | B62B 3/108 |
| 11,370,467 B1* | 6/2022 | Horowitz | B62B 3/007 |
| 11,577,766 B2* | 2/2023 | Horowitz | B62B 5/065 |
| 11,667,313 B2* | 6/2023 | Wu | B62B 5/067 |
| | | | 280/651 |
| 11,851,097 B2* | 12/2023 | Chu | B62B 3/007 |
| 11,932,298 B2* | 3/2024 | Sun | B62B 3/007 |
| 12,263,876 B1* | 4/2025 | Zhu | B62B 3/025 |
| 12,296,882 B1* | 5/2025 | Wu | B62B 3/02 |
| 2011/0204598 A1* | 8/2011 | Stevenson | B62B 3/02 |
| | | | 280/639 |
| 2018/0327011 A1* | 11/2018 | Horowitz | B62B 3/025 |
| 2021/0107548 A1* | 4/2021 | Wang | B62B 3/007 |
| 2021/0300449 A1* | 9/2021 | Yang | B62B 3/025 |
| 2023/0227087 A1* | 7/2023 | Sun | B62B 3/025 |
| | | | 280/42 |
| 2024/0051589 A1* | 2/2024 | Zhou | B62B 5/0438 |
| 2024/0300560 A1* | 9/2024 | Zhang | B62B 3/007 |

\* cited by examiner

EXPANDABLE CART

CROSS REFERENCE TO THE RELATED APPLICATIONS

This application is based upon and claims priority to Chinese Patent Application No. 202310206034.5, filed on Mar. 6, 2023; Chinese Patent Application No. 202320398334.3, filed on Mar. 6, 2023; and Chinese Patent Application 202320398335.8, filed on Mar. 6, 2023, the entire contents of which are incorporated herein by reference.

TECHNICAL FIELD

The present disclosure relates to the technical field of carts, and in particular, to an expandable cart.

BACKGROUND

In daily life and production, it is often necessary to carry luggage or articles, and carts are often used in this process. Carts are widely used to carry things because they can be pushed easily and save time and effort. Many carts now use a flat plate, with wheels mounted under the flat plate for consignment. This kind of cart cannot be folded, and thus takes up a lot of space when it is not in use and is inconvenient to carry.

At present, there are some foldable carts. However, these foldable carts have a limited volume and are still too large after being folded.

SUMMARY

(I) Technical Problems to be Solved

To overcome the above shortcomings of the prior art, the present disclosure provides an expandable cart, which solves the technical problems that the cart is too large after being folded and the volume of the cart is small.

(II) Technical Solutions

To achieve the above objective, the expandable cart of the present disclosure includes a lifting mechanism, a first folding mechanism, a second folding mechanism, a third folding mechanism, a fourth folding mechanism, and a bottom support mechanism; the lifting mechanism includes a first telescopic column, a second telescopic column, a third telescopic column, and a fourth telescopic column arranged vertically and capable of telescoping;

the first telescopic column, the second telescopic column, the third telescopic column, and the fourth telescopic column are rectangularly arranged at intervals, and the first folding mechanism, the second folding mechanism, the third folding mechanism, and the fourth folding mechanism are sequentially connected between two adjacent telescopic columns;

the bottom support mechanism is capable of being folded upward, and the first telescopic column, the second telescopic column, the third telescopic column, the fourth telescopic column, the third folding mechanism, and the fourth folding mechanism are all connected to the bottom support mechanism; and the first folding mechanism, the second folding mechanism, the third folding mechanism, and the fourth folding mechanism are all capable of being folded and contracted.

Optionally, heights of the bottom support mechanism, the first folding mechanism, the second folding mechanism, the third folding mechanism, and the fourth folding mechanism after being folded and contracted are all smaller than or equal to a minimum height of the lifting mechanism after being contracted.

Optionally, the first telescopic column, the second telescopic column, the third telescopic column, and the fourth telescopic column each include a fixed link, a riser tube, and a limiting mechanism;

the fixed link and the riser tube are both arranged vertically, and the riser tube is slidably sleeved in the fixed link and located above the fixed link;

the first folding mechanism, the second folding mechanism, the third folding mechanism, and the fourth folding mechanism are all connected to the fixed links of the corresponding telescopic columns;

the limiting mechanism includes a sliding inner plug and an adjustment clamp spring;

the adjustment clamp spring is disposed in the riser tube and provided with a limiting column, a first through hole is formed in the riser tube, and the limiting column is sleeved in the first through hole; and a plurality of second through holes are axially formed at intervals in the fixed link, and the limiting column is capable of passing through the first through hole and any one of the second through holes at the same time.

Optionally, the third folding mechanism and the fourth folding mechanism each include a first scissor linkage assembly, a second scissor linkage assembly, and a third scissor linkage assembly hinged in sequence, and the first scissor linkage assembly, the second scissor linkage assembly, and the third scissor linkage assembly each include two rotatably connected linkages;

first ends of first linkages of the first scissor linkage assemblies of the third folding mechanism and the fourth folding mechanism are slidably connected to the first telescopic column and the second telescopic column in one-to-one correspondence;

first ends of second linkages of the first scissor linkage assemblies of the third folding mechanism and the fourth folding mechanism are rotatably connected to the first telescopic column and the second telescopic column in one-to-one correspondence;

first ends of first linkages of the third scissor linkage assemblies of the third folding mechanism and the fourth folding mechanism are slidably connected to the third telescopic column and the fourth telescopic column in one-to-one correspondence; and first ends of second linkages of the third scissor linkage assemblies of the third folding mechanism and the fourth folding mechanism are rotatably connected to the third telescopic column and the fourth telescopic column in one-to-one correspondence.

Optionally, a distance between second ends of the two linkages of each of the first scissor linkage assembly and the third scissor linkage assembly is smaller than a distance between the first ends thereof;

the second ends of the two linkages of the first scissor linkage assembly are bent toward a horizontal axis of symmetry of the first scissor linkage assembly;

the second ends of the two linkages of the third scissor linkage assembly are bent toward a horizontal axis of symmetry of the third scissor linkage assembly; and two ends of each of the two linkages of the second scissor linkage assembly are both bent toward a horizontal axis of symmetry of the second scissor linkage assembly, and a distance between first ends of the two linkages of the second scissor linkage assembly is equal to a distance between second ends thereof.

Optionally, slide sleeves are slidably sleeved on the first telescopic column, the second telescopic column, the third telescopic column, and the fourth telescopic column, respectively; and the first ends of the first linkages of the first scissor linkage assembly and the third scissor linkage assembly are rotatably connected to the slide sleeves.

Optionally, middle hinged joints of two sides of the bottom support mechanism are respectively hinged to junctions of the second scissor linkage assemblies of the third folding mechanism and the fourth folding mechanism by means of a first hanger rod and a second hanger rod, and a height of the bottom support mechanism after being folded upward is smaller than or equal to the minimum height of the lifting mechanism after being contracted.

Optionally, the bottom support mechanism includes a first connector, a second connector, a third connector, a fourth connector, a first fulcrum bar, a second fulcrum bar, a third fulcrum bar, a fourth fulcrum bar, a fifth fulcrum bar, a sixth fulcrum bar, a seventh fulcrum bar, and an eighth fulcrum bar;

first ends of the first fulcrum bar, the second fulcrum bar, the third fulcrum bar, and the fourth fulcrum bar are all rotatably connected to the first connector, and first ends of the fifth fulcrum bar, the sixth fulcrum bar, the seventh fulcrum bar, and the eighth fulcrum bar are all rotatably connected to the second connector;

a second end of the first fulcrum bar is rotatably connected to a bar body of the first telescopic column, a second end of the second fulcrum bar is rotatably connected to a bar body of the second telescopic column, a second end of the fifth fulcrum bar is rotatably connected to a bar body of the third telescopic column, and a second end of the sixth fulcrum bar is rotatably connected to a bar body of the fourth telescopic column;

second ends of the third fulcrum bar and the seventh fulcrum bar are both rotatably connected to the third connector, and second ends of the fourth fulcrum bar and the eighth fulcrum bar are both rotatably connected to the fourth connector;

the first fulcrum bar, the second fulcrum bar, the fifth fulcrum bar, and the sixth fulcrum bar have a same length, the third fulcrum bar, the fourth fulcrum bar, the seventh fulcrum bar, and the eighth fulcrum bar have a same length, the first fulcrum bar is longer than the third fulcrum bar, and when the bottom support mechanism is folded upward, the first connector and the second connector are close to a center of the expandable cart; and the first hanger rod is slidably connected to the third connector, and the second hanger rod is slidably connected to the fourth connector.

Optionally, the expandable cart further includes a handle mechanism;

the handle mechanism includes a telescopic pull rod, a first cross bar, a second cross bar, and a pull ring;

the first cross bar is provided with a first end rotatably connected to the bar body of the first telescopic column and a second end rotatably connected to a first end of the telescopic pull rod, and the first cross bar is capable of rotating vertically downward only with a connection point between the first end of the first cross bar and the bar body of the first telescopic column as a rotation center;

the second cross bar is provided with a first end rotatably connected to the bar body of the second telescopic column and a second end rotatably connected to the first end of the telescopic pull rod, and the second cross bar is capable of rotating vertically downward only with a connection point between the first end of the second cross bar and the bar body of the second telescopic column as the rotation center;

a second end of the telescopic pull rod is connected to the pull ring; and a height of the handle mechanism after being contracted is smaller than or equal to the minimum height of the lifting mechanism after being contracted.

Optionally, the expandable cart further includes a cloth container, rollers, and top foot fasteners;

the cloth container is sleeved on the first folding mechanism, the second folding mechanism, the third folding mechanism, and the fourth folding mechanism;

the top foot fasteners are respectively disposed at upper ends of the first telescopic column, the second telescopic column, the third telescopic column, and the fourth telescopic column, and an opening end of the cloth container is connected to the top foot fasteners; and the rollers are respectively disposed at lower ends of the first telescopic column, the second telescopic column, the third telescopic column, and the fourth telescopic column.

(III) Beneficial Effects

The overall height of the cart can be increased by stretching the first telescopic column, the second telescopic column, the third telescopic column, and the fourth telescopic column, thereby increasing the volume of the cart. The first folding mechanism is folded and extruded between the first telescopic column and the second telescopic column, the second folding mechanism is folded and extruded between the third telescopic column and the fourth telescopic column, the third folding mechanism is folded and extruded between the first telescopic column and the third telescopic column, the fourth folding mechanism is folded and extruded between the second telescopic column and the fourth telescopic column, and the four telescopic columns are contracted and close to each other, thereby effectively reducing the folding volume of the expandable cart, and facilitating storage and carrying by a user.

REFERENCE NUMERALS

1: First folding mechanism; 11: First fork rod; 12: Second fork rod; 13: Third fork rod; 14: Fourth fork rod;

2: Second folding mechanism; 21: Fifth fork rod; 22: Sixth fork rod; 23: Seventh fork rod; 24: Eighth fork rod;

3: Third folding mechanism; 30: Second scissor linkage assembly; 31: Fifth linkage; 32: Sixth linkage; 33: Seventh linkage; 34: Eighth linkage;

4: Fourth folding mechanism; 41: Ninth linkage; 42: Tenth linkage; 43: Eleventh linkage; 44: Twelfth linkage;

51: First telescopic column; 52: Second telescopic column; 53: Third telescopic column; 54: Fourth telescopic column; 511: First slide sleeve; 521: Second slide sleeve; 531: Third slide sleeve; 541: Fourth slide sleeve;

551: Fixed link; 552: Riser tube; 553: Sliding inner plug; 554: Adjustment clamp spring; 556: Limiting column;

6: Bottom support mechanism; 61: First connector; 62: Second connector; 63: Third connector; 64: Fourth connector; 601: First fulcrum bar; 602: Second fulcrum bar; 603: Third fulcrum bar; 604: Fourth fulcrum bar; 605: Fifth fulcrum bar; 606: Sixth fulcrum bar; 607: Seventh fulcrum bar; 608: Eighth fulcrum bar;

71: First hanger rod; 72: Second hanger rod;

8: Handle mechanism; 80: Telescopic pull rod; 81: First cross bar; 82: Second cross bar; 83: Pull ring;

9: Roller;

10: Top foot fastener; and

100: Axis of symmetry

DETAILED DESCRIPTION OF THE EMBODIMENTS

To facilitate a better understanding of the present disclosure, the present disclosure is described in detail below with reference to the accompanying drawings and specific embodiments. The terms such as "upper" and "lower" mentioned herein are based on the orientations shown in FIG. 1.

Although the accompanying drawings show exemplary embodiments of the present disclosure, it should be understood that the present disclosure may be implemented in various forms and should not be limited to the embodiments set forth herein. The embodiments are provided for a more thorough understanding of the present disclosure, so as to make the scope of the present disclosure be fully conveyed to those skilled in the art.

As shown in FIG. 1 to FIG. 4, the present disclosure provides an expandable cart, including a lifting mechanism, first folding mechanism 1, second folding mechanism 2, third folding mechanism 3, and fourth folding mechanism 4. The first folding mechanism 1 and the second folding mechanism 2 are separately located at the front and rear parts of the expandable cart, and the third folding mechanism 3 and fourth folding mechanism 4 are separately located at the left and right parts of the expandable cart. The lifting mechanism includes first telescopic column 51, second telescopic column 52, third telescopic column 53, and fourth telescopic column 54 arranged vertically and capable of telescoping. The first telescopic column 51, the second telescopic column 52, the third telescopic column 53, and the fourth telescopic column 54 are rectangularly arranged at intervals. The telescopic columns change their own lengths by stretching, thereby changing the overall height of the cart, and then realizing expansion of the cart. Specifically, two ends of the first folding mechanism 1 are connected to a bar body of the first telescopic column 51 and a bar body of the second telescopic column 52 in one-to-one correspondence, two ends of the second folding mechanism 2 are connected to a bar body of the third telescopic column 53 and a bar body of the fourth telescopic column 54 in one-to-one correspondence, two ends of the third folding mechanism 3 are connected to the bar body of the first telescopic column 51 and the bar body of the third telescopic column 53 in one-to-one correspondence, and two ends of the fourth folding mechanism 4 are connected to the bar body of the second telescopic column 52 and the bar body of the fourth telescopic column 54 in one-to-one correspondence. The first folding mechanism 1 and the second folding mechanism 2 are arranged oppositely, and the third folding mechanism 3 and fourth folding mechanism 4 are arranged oppositely. The first folding mechanism 1, the second folding mechanism 2, the third folding mechanism 3, and fourth folding mechanism 4 can be folded or stretched at the same time.

Figure 1:
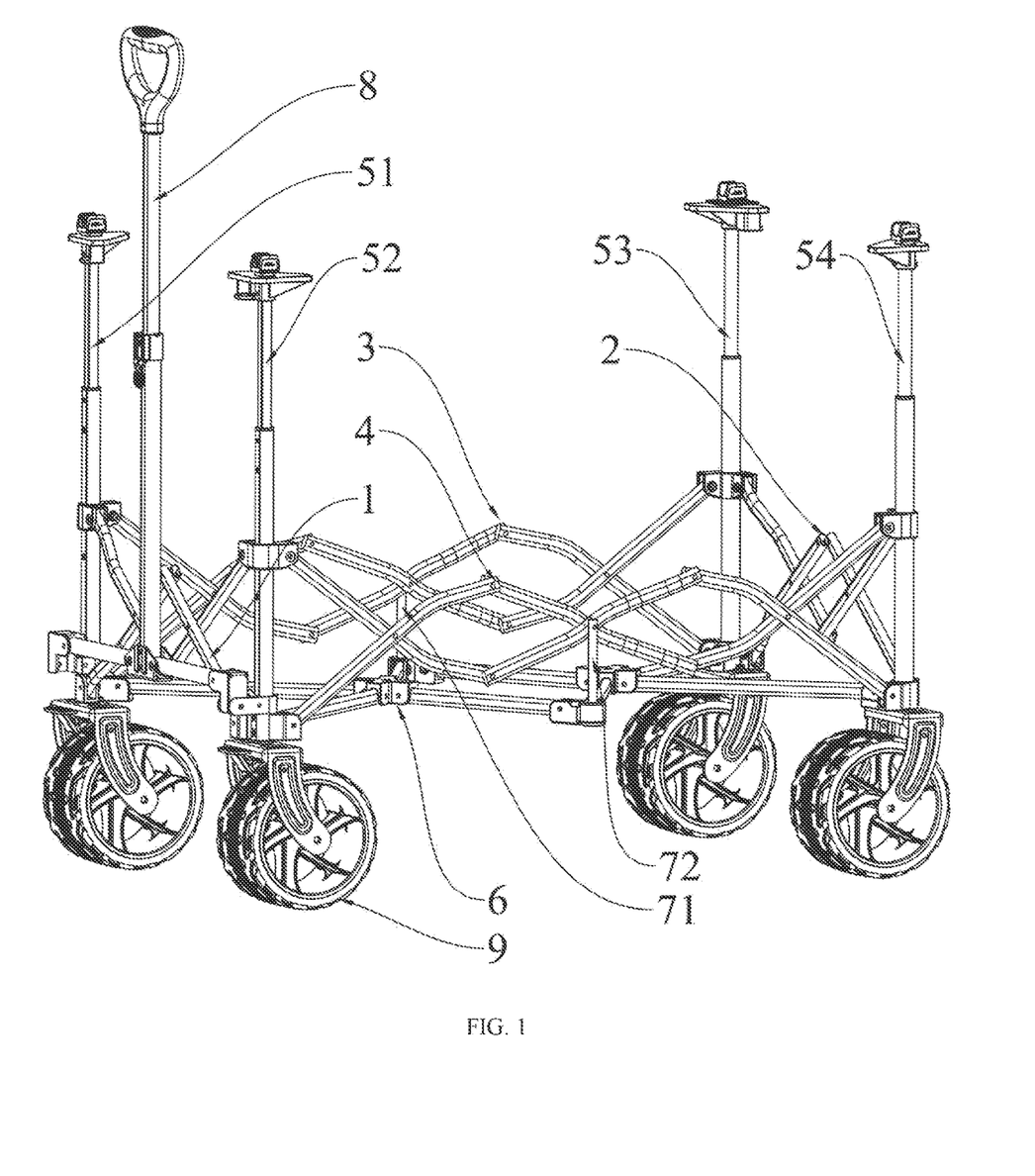
FIG. 1 is a structural diagram of an expandable cart of the present disclosure.

As shown in FIG. 1, when the first folding mechanism 1, the second folding mechanism 2, the third folding mechanism 3, and fourth folding mechanism 4 are all in a stretched state, the first telescopic column 51, the second telescopic column 52, the third telescopic column 53, and the fourth telescopic column 54 are taken as columns of the respective folding mechanisms to sequentially connect the first folding mechanism 1, the second folding mechanism 2, the third folding mechanism 3, and fourth folding mechanism 4 for accommodating articles. The volume of the cart can be effectively increased by changing the length of each folding mechanism, and the overall height of the cart can be increased by stretching the first telescopic column 51, the second telescopic column 52, the third telescopic column 53, and the fourth telescopic column 54, thereby further increasing the volume of the cart.

Figure 2:
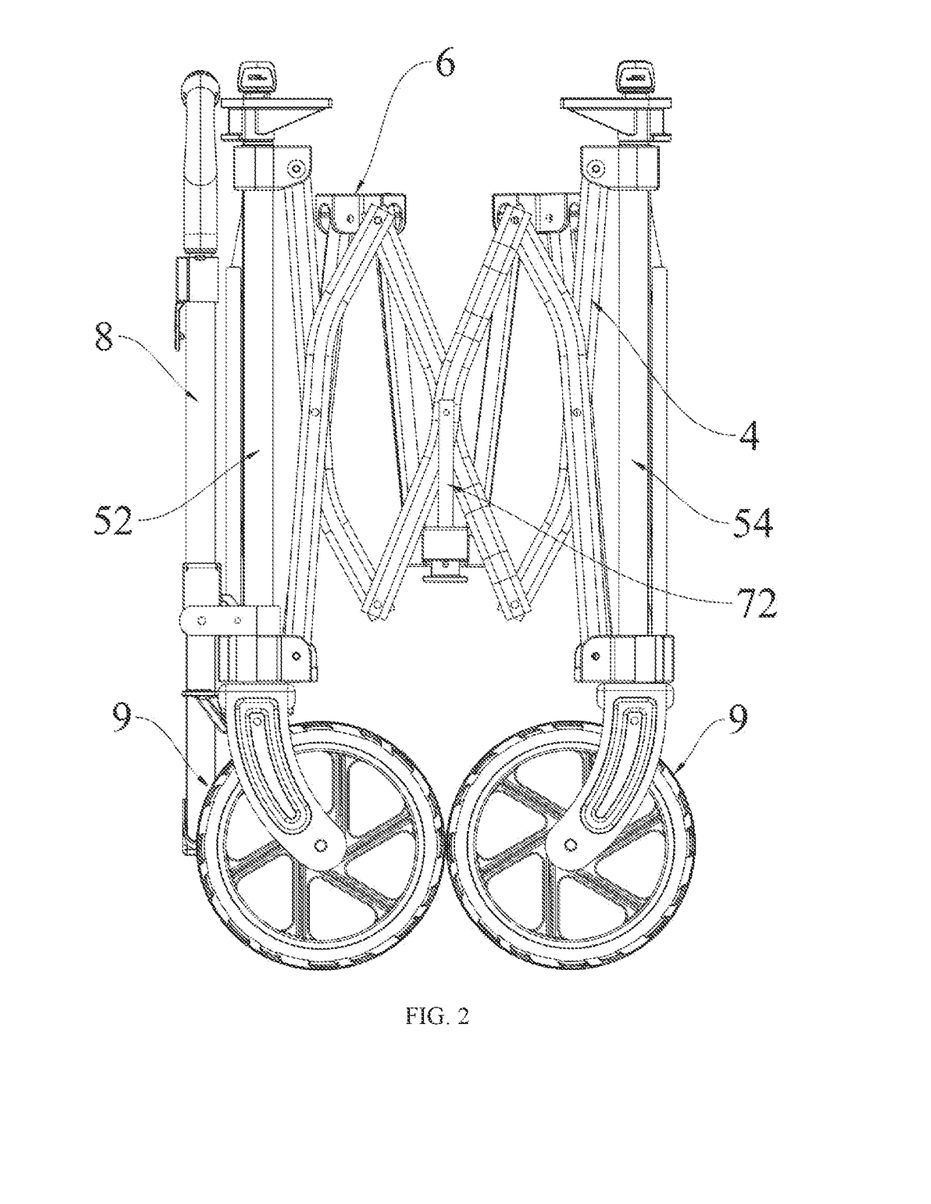
FIG. 2 is a front view of an expandable cart of the present disclosure in a folded state.
Figure 3:
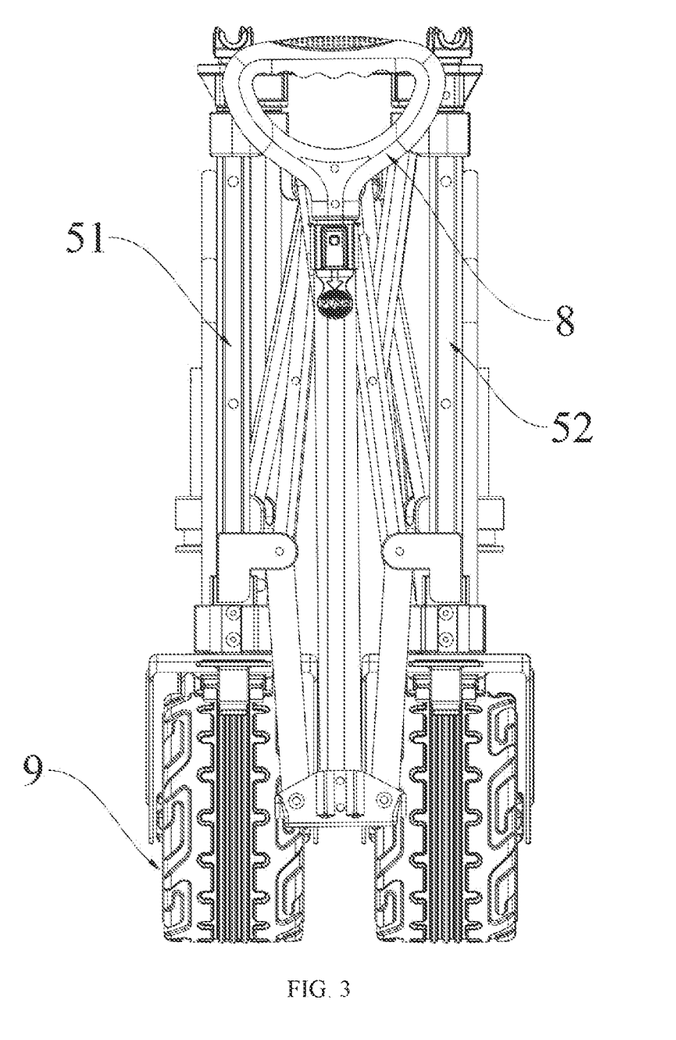
FIG. 3 is a left view of an expandable cart of the present disclosure in a folded state.

As shown in FIG. 2 and FIG. 3, when the first folding mechanism 1, the second folding mechanism 2, the third folding mechanism 3, and fourth folding mechanism 4 are folded at the same time, the first folding mechanism 1 is folded and extruded between the first telescopic column 51 and the second telescopic column 52, the second folding mechanism 2 is folded and extruded between the third telescopic column 53 and the fourth telescopic column 54, the third folding mechanism 3 is folded and extruded between the first telescopic column 51 and the third telescopic column 53, the fourth folding mechanism 4 is folded and extruded between the second telescopic column 52 and the fourth telescopic column 54, and the four telescopic columns are close to each other. Moreover, heights of the first folding mechanism 1, the second folding mechanism 2, the third folding mechanism 3, and the fourth folding mechanism 4 after being folded and contracted are all smaller than or equal to a minimum height of each telescopic column of the lifting mechanism after being contracted, thereby effectively reducing the folding volume of the expandable cart. The first telescopic column 51, the second telescopic column 52, the third telescopic column 53, and the fourth telescopic column 54 are retracted to a shortest state, thereby further reducing the folding volume of the expandable cart, and facilitating storage and carrying by a user.

Figure 4:
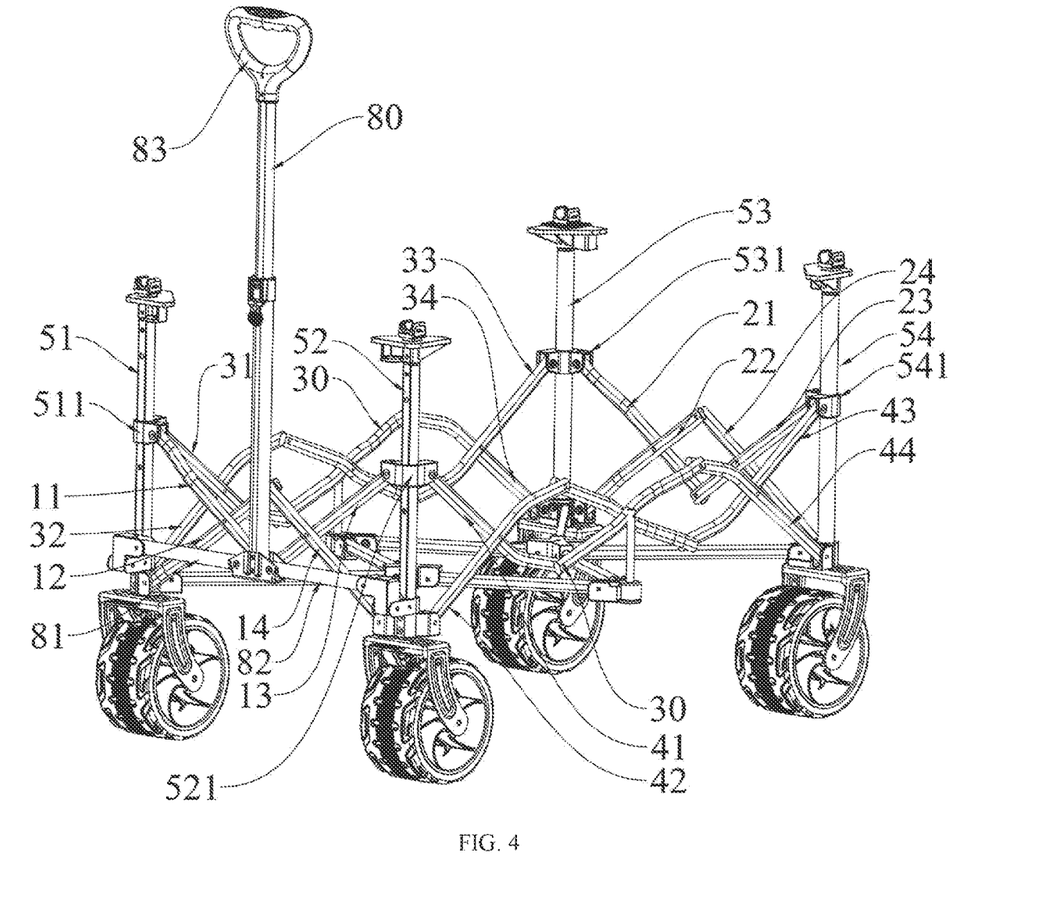
FIG. 4 is a stereoscopic diagram of an expandable cart of the present disclosure in a use state.
Figure 5:
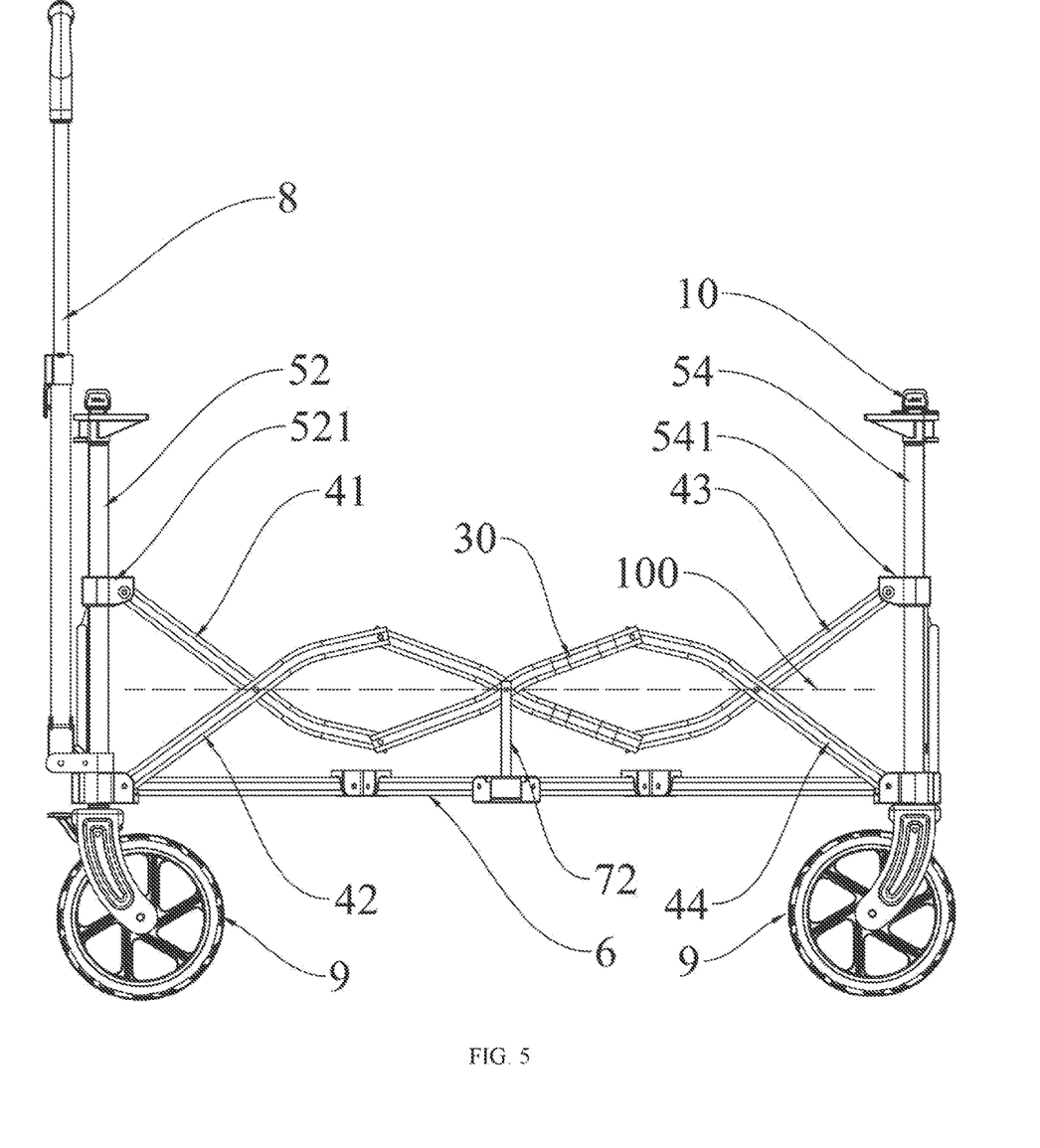
FIG. 5 is a front view of an expandable cart of the present disclosure in a use state.

As shown in FIG. 1, FIG. 4, and FIG. 5, the third folding mechanism 3 and the fourth folding mechanism 4 each include a first scissor linkage assembly, second scissor linkage assembly 30, and a third scissor linkage assembly hinged in sequence. The first scissor linkage assembly, the second scissor linkage assembly 30, and the third scissor linkage assembly each include two rotatably connected linkages. The first scissor linkage assembly of the third folding mechanism 3 includes fifth linkage 31 and sixth linkage 32 rotatably connected to each other, and the third scissor linkage assembly of the third folding mechanism 3 includes seventh linkage 33 and eighth linkage 34 rotatably connected to each other. A first end of the fifth linkage 31 is slidably connected to a bar body of the first telescopic column 51, a first end of the sixth linkage 32 is rotatably connected to the bar body of the first telescopic column 51, and a rotatable connection point is close to a lower end of the bar body. A first end of the seventh linkage 33 is slidably connected to a bar body of the third telescopic column 53, a first end of the eighth linkage 34 is rotatably connected to the bar body of the third telescopic column 53, and a rotatable connection point is close to a lower end of the bar body. Similarly, the first scissor linkage assembly of the fourth folding mechanism 4 includes ninth linkage 41 and tenth linkage 42 rotatably connected to each other, and the third scissor linkage assembly of the fourth folding mechanism 4 includes eleventh linkage 43 and twelfth linkage 44 rotatably connected to each other. A first end of the ninth linkage 41 is slidably connected to a bar body of the second telescopic column 52, and a first end of the tenth linkage 42 is rotatably connected to the bar body of the second telescopic column 52. A first end of the eleventh linkage 43 is slidably connected to a bar body of the fourth telescopic column 54, and a first end of the twelfth linkage 44 is rotatably connected to the bar body of the fourth telescopic column 54. The fourth folding mechanism 4 has the same structure as the third folding mechanism 3, and only differs from the third folding mechanism 3 in the mounting position. Therefore, the structure of the fourth folding mechanism 4 is not repeated herein again. The second scissor linkage assembly 30 is connected between the first scissor linkage assembly and the third scissor linkage assembly. Specifically, the second scissor linkage assemblies 30 of the third folding mechanism and the fourth folding mechanism each include two rotatably connected linkages. Both ends of the two linkages are bent toward their own axes of symmetry 100, and a distance between first ends of the two linkages is equal to a distance between second ends thereof. Two ends of a first linkage of the second scissor linkage assembly 30 of the third folding mechanism are respectively hinged to the fifth linkage 31 and the eighth linkage 34 in one-to-one correspondence, and two ends of a second linkage are respectively hinged to the sixth linkage 32 and the seventh linkage 33 in one-to-one correspondence. Two ends of a first linkage of the second scissor linkage assembly 30 of the fourth folding mechanism are respectively hinged to the ninth linkage 41 and the twelfth linkage 44 in one-to-one correspondence, and two ends of a second linkage are respectively hinged to the tenth linkage 42 and the eleventh linkage 43 in one-to-one correspondence. Second ends of the fifth linkage 31, the sixth linkage 32, the seventh linkage 33, and the eighth linkage 34 are all bent toward their own axes 100 of symmetry. That is, the second ends of the fifth linkage 31 and the sixth linkage 32 are bent and tilted toward each other, and the second ends of the seventh linkage 33 and the eighth linkage 34 are bent and tilted toward each other. A horizontal height of the second end of the sixth linkage 32 is always lower than a horizontal height of the first end of the fifth linkage 31, and a horizontal height of the second end of the eighth linkage 34 is always lower than a horizontal height of the first end of the seventh linkage 33, such that opening angles of the first ends of the first scissor linkage assembly and the third scissor linkage assembly are greater than opening angles of the second ends thereof. After the first scissor linkage assembly and the third scissor linkage assembly are folded, the heights of the second ends of the fifth linkage 31, the sixth linkage 32, the seventh linkage 33, and the eighth linkage 34 are effectively reduced, such that the heights of the fifth linkage 31, the sixth linkage 32, the seventh linkage 33, and the eighth linkage 34 after folding are lower than the minimum height of the telescopic columns after being contracted, and the height of the cart after folding is prevented from changing. The fourth folding mechanism 4 has the same structure as the third folding mechanism 3. After the fourth folding mechanism 4 is folded and contracted, the heights of the ninth linkage 41, the tenth linkage 42, the eleventh linkage 43, and the twelfth linkage 44 are all smaller than or equal to the minimum height of the telescopic columns after being contracted.

As shown in FIG. 4, first slide sleeve 511 is slidably sleeved on the bar body of the first telescopic column 51, second slide sleeve 521 is slidably sleeved on the bar body of the second telescopic column 52, third slide sleeve 531 is slidably sleeved on the bar body of the third telescopic column 53, and fourth slide sleeve 541 is slidably sleeved on the bar body of the fourth telescopic column 54. The first end of the fifth linkage 31 is rotatably connected to the first slide sleeve 511, the first end of the seventh linkage 33 is rotatably connected to the third slide sleeve 531, the first end of the ninth linkage 41 is rotatably connected to the second slide sleeve 521, and the first end of the eleventh linkage 43 is rotatably connected to the fourth slide sleeve 541. When the slide sleeves slide along the bar bodies, the linkages move synchronously and are rotatably folded themselves. By using the slide sleeve structures, the sliding is smoother, thereby improving the smoothness of operations.

Figure 6:
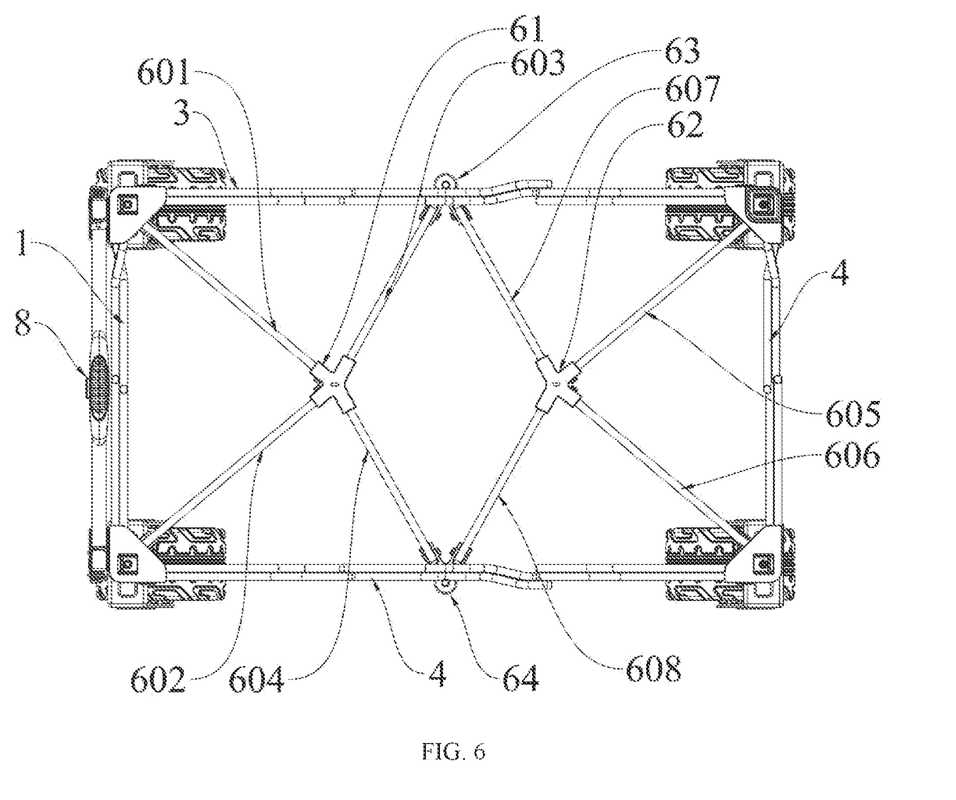
FIG. 6 is a top view of an expandable cart of the present disclosure in a use state.

As shown in FIG. 1 and FIG. 6, the bottom support mechanism 6 includes first connector 61, second connector 62, third connector 63, fourth connector 64, first fulcrum bar 601, second fulcrum bar 602, third fulcrum bar 603, fourth fulcrum bar 604, fifth fulcrum bar 605, sixth fulcrum bar 606, seventh fulcrum bar 607, and eighth fulcrum bar 608. When the cart is in a use state, the first connector 61, the second connector 62, the third connector 63, the fourth connector 64, the first fulcrum bar 601, the second fulcrum bar 602, the third fulcrum bar 603, the fourth fulcrum bar 604, the fifth fulcrum bar 605, the sixth fulcrum bar 606, the seventh fulcrum bar 607, and the eighth fulcrum bar 608 are all horizontally supported on a bottom plate. The first connector 61 is provided with four support arms and arranged horizontally. Mounting grooves having downward openings are formed in the support arms. The first fulcrum bar 601, the second fulcrum bar 602, the third fulcrum bar 603, and the fourth fulcrum bar 604 are rotatably connected to the mounting grooves in the four support arms of the first connector 61 in one-to-one correspondence. Because the fulcrum bars are limited by the mounting grooves, the fulcrum bars can only rotate downward in a horizontal state. Similarly, the second connector 62 has the same structure as the first connector 61. Therefore, first ends of the fifth fulcrum bar 605, the sixth fulcrum bar 606, the seventh fulcrum bar 607, and the eighth fulcrum bar 608 are all rotatably connected to the mounting grooves in the four support arms of the second connector 62 in one-to-one correspondence. A second end of the first fulcrum bar 601 is rotatably connected to the lower end of the bar body of the first telescopic column 51, and a second end of the second fulcrum bar 602 is rotatably connected to the lower end of the bar body of the second telescopic column 52. A second end of the fifth fulcrum bar 605 is rotatably connected to the lower end of the bar body of the third telescopic column 53, and a second end of the sixth fulcrum bar 606 is rotatably connected to the lower end of the bar body of the fourth telescopic column 54. The third connector 63 and the fourth connector 64 are each provided with two support arms and are both arranged horizontally. Mounting grooves having upward openings are formed in the two support arms. The second ends of the third fulcrum bar 603 and the seventh fulcrum bar 607 are both rotatably connected to the mounting grooves in the support arms of the third connector 63, and the second ends of the fourth fulcrum bar 604 and the eighth fulcrum bar 608 are both rotatably connected to the mounting grooves in the support arms of the fourth connector 64. Therefore, the support arms can only rotate upward in the horizontal state. The first fulcrum bar 601, the second fulcrum bar 602, the fifth fulcrum bar 605, and the sixth fulcrum bar 606 have a same length; the third fulcrum bar 603, the fourth fulcrum bar 604, the seventh fulcrum bar 607, and the eighth fulcrum bar 608 have a same length; and the first fulcrum bar 601 is longer than the third fulcrum bar 603. When the expandable cart is folded, the bottom support mechanism 6 is folded upward, and the first connector 61 and the second connector 62 are close to the center of the expandable cart. As shown in FIG. 2, when the cart is folded and compressed to a folded state from the use state, the first connector 61 and the second connector 62 are located at the central position of the expandable cart in the folded state, and the fulcrum bars rotate to be close to each other, thereby reducing the bottom support mechanism 6 and then folding and contracting the cart. After the bottom support mechanism 6 is folded, the heights of the first connector and the second connector are both smaller than or equal to the minimum height of the lifting mechanism after being contracted.

As shown in FIG. 2 and FIG. 4, the expandable cart further includes first hanger rod 71 and second hanger rod 72. The first hanger rod 71 is provided with a first end rotatably connected to a rotation point of the second scissor linkage assembly 30 of the third folding mechanism 3 and a second end slidably connected to the third connector 63. The second hanger rod 72 is provided with a first end rotatably connected to a rotation point of the second scissor linkage assembly 30 of the fourth folding mechanism 4 and a second end slidably connected to the fourth connector 64. The tips of the second ends of the first hanger rod 71 and the second hanger rod 72 are both connected to limiting members, thereby preventing the first hanger rod 71 and the second hanger rod 72 from respectively escaping from the third connector 63 and the fourth connector 64, such that the first hanger rod 71 and the second hanger rod 72 assist in respectively supporting the third connector 63 and the fourth connector 64 to ensure that the bottom support mechanism 6 remains horizontal when the cart is in the use state.

As shown in FIG. 1 and FIG. 4, the expandable cart further includes handle mechanism 8 adjacent to the first folding mechanism 1. The handle mechanism 8 includes telescopic pull rod 80, first cross bar 81, second cross bar 82, and pull ring 83. The first cross bar 81 is provided with a first end rotatably connected to the bar body of the first telescopic column 51 and a second end rotatably connected to a first end of the telescopic pull rod 80, and the first cross bar 81 is capable of rotating vertically downward only with a connection point between the first end of the first cross bar 81 and the bar body of the first telescopic column 51 as a rotation center. The second cross bar 82 is provided with a first end rotatably connected to the bar body of the second telescopic column 52 and a second end rotatably connected to the first end of the telescopic pull rod 80, and the second cross bar 82 is capable of rotating vertically downward only with a connection point between the first end of the second cross bar 82 and the bar body of the second telescopic column 52 as the rotation center. During folding, the second ends of the first cross bar 81 and the second cross bar 82 rotate downward to be close to each other, such that the telescopic pull rod 80 moves downward. Meanwhile, in combination with a telescopic function of the telescopic pull rod 80, the height of the upper end of the telescopic pull rod 80 is effectively reduced, and the height of the handle mechanism 8 after being contracted is ensured to be smaller than or equal to the minimum height of the lifting mechanism after being contracted. The telescopic pull rod 80 can rotate within a vertical plane. When a user drags the cart, the telescopic pull rod 80 is rotated to a proper angle to adapt to users of different heights. The second end of the telescopic pull rod 80 is connected to the pull ring 83, thereby facilitating holding by a user.

Figure 7:
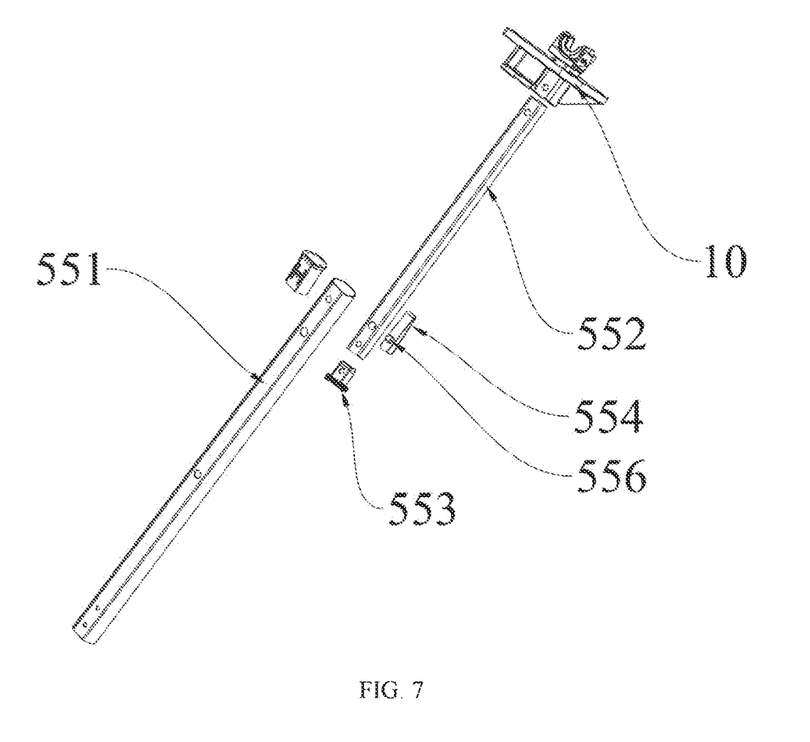
FIG. 7 is an exploded view of a telescopic column of an expandable cart of the present disclosure.

As shown in FIG. 1, FIG. 4, and FIG. 7, the first telescopic column 51, the second telescopic column 52, the third telescopic column 53, and the fourth telescopic column 54 each include fixed link 551 arranged vertically, and riser tube 552 slidably sleeved in the fixed link 551. The linkage assemblies of the first folding mechanism 1 and the second folding mechanism 2 located at both ends are all connected to the fixed link 551. Both ends of the third folding mechanism 3 and the fourth folding mechanism 4 are also connected to the fixed link 551.

As shown in FIG. 7, the limiting mechanism includes sliding inner plug 553 and adjustment clamp spring 554. The sliding inner plug 553 is connected to a lower end of the riser tube 552 to increase the smoothness of sliding. The adjustment clamp spring 554 is a conventional structure, including two elastic pieces with first ends connected together. The adjustment clamp spring 554 is clamped in the riser tube 552. The elastic pieces of the adjustment clamp spring 554 are provided with limiting column 556, a first through hole is formed in the riser tube 552, and a plurality of second through holes are axially formed at intervals in the fixed link 551. When the riser tube 552 rises until the first through hole is aligned with the second through hole, the limiting column 556 on the adjustment clamp spring 554 simultaneously passes through the first through hole and the second through hole which are aligned with each other, thereby limiting the riser tube 552. Preferably, the expandable cart further includes a cloth container, rollers 9, and top foot fasteners 10. With reference to FIG. 5, the rollers 9 are disposed at the lower end of the fixed link 551, and the top foot fasteners 10 are mounted at the upper end of the riser tube 552. The cloth container is sleeved on the first folding mechanism 1, the second folding mechanism 2, the third folding mechanism 3, and the fourth folding mechanism 4; or, the first folding mechanism 1, the second folding mechanism 2, the third folding mechanism 3, and the fourth folding mechanism 4 wrap the cloth container; or, the cloth container wraps the first folding mechanism 1, the second folding mechanism 2, the third folding mechanism 3, and the fourth folding mechanism 4. Four corners of an opening of the cloth container are detachably connected to the four top foot fasteners 10 in one-to-one correspondence.

As shown in FIG. 1 and FIG. 4, the first folding mechanism 1 includes two fourth scissor linkage assemblies, and the second folding mechanism 2 includes two fifth scissor linkage assemblies. A first one of the two fourth scissor linkage assemblies includes first fork rod 11 and second fork rod 12 rotatably connected to each other, and a second one of the two fourth scissor linkage assemblies includes third fork rod 13 and fourth fork rod 14 rotatably connected to each other. A first one of the two fifth scissor linkage assemblies includes fifth fork rod 21 and sixth fork rod 22 rotatably connected to each other, and a second one of the two fifth scissor linkage assemblies includes seventh fork rod 23 and eighth fork rod 24 rotatably connected to each other. The length of each fork rod is smaller than or equal to the minimum length of the first telescopic column 51 after being contracted. A first end of the first fork rod 11 is rotatably connected to the first slide sleeve 511 on the fixed link 551 of the first telescopic column 51, a first end of the second fork rod 12 is rotatably connected to the fixed link 551 of the first telescopic column 51, and the connection point is close to the lower end of the fixed link 551. A first end of the third fork rod 13 is rotatably connected to the second slide sleeve 521 on the fixed link 551 of the second telescopic column 52, a first end of the fourth fork rod 14 is rotatably connected to the fixed link 551 of the second telescopic column 52, and the connection point is close to the lower end of the fixed link 551. A second end of the first fork rod 11 is hinged to a second end of the third fork rod 13, and a second end of the second fork rod 12 is hinged to a second end of the fourth fork rod 14. A first end of the fifth fork rod 21 is rotatably connected to the third slide sleeve 531 on the fixed link 551 of the third telescopic column 53, a first end of the sixth fork rod 22 is rotatably connected to the fixed link 551 of the third telescopic column 53, and the connection point is close to the lower end of the fixed link 551. A first end of the seventh fork rod 23 is rotatably connected to the fourth slide sleeve 541 on the fixed link 551 of the fourth telescopic column 54, a first end of the fourth fork rod 24 is rotatably connected to the fixed link 551 of the fourth telescopic column 54, and the connection point is close to the lower end of the fixed link 551. A second end of the fifth fork rod 21 is hinged to a second end of the seventh fork rod 23, and a second end of the sixth fork rod 22 is hinged to a second end of the eighth fork rod 24. When the first folding mechanism 1 and the second folding mechanism 2 are folded and compressed, two rotatably connected fork rods are crossed and folded, and at this time, the first folding mechanism 1 and the second folding mechanism 2 are shortened to reduce a distance between two columns, such that the two columns are close to each other. Because the length of each fork rod is smaller than or equal to the minimum length of the first telescopic column 51 after being contracted, the overall height of the cart does not change after the fork rods are crossed and folded. The use of two scissor linkage assemblies can ensure, on the premise of increasing the volume of the cart in the use state, that the cart still has a smaller volume in the folded state.

It should be understood that in the description of the present disclosure, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified, the terms such as "mounting", "interconnection", "connection" and "fixation" are intended to be understood in a broad sense. For example, the "connection" may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise explicitly specified, when it is described that a first feature is "above" or "below" a second feature, it indicates that the first and second features are in direct contact or the first and second features are in indirect contact through an intermediate feature. In addition, when it is described that the first feature is "over", "above" and "on" the second feature, it indicates that the first feature is directly or obliquely above the second feature, or simply indicates that an altitude of the first feature is higher than that of the second feature. When it is described that a first feature is "under", "below" or "beneath" a second feature, it indicates that the first feature is directly or obliquely under the second feature or simply indicates that the first feature is lower than the second feature.

In the description of this specification, the description with reference to the terms such as "one embodiment", "some embodiments", "example", "specific example" or "some examples" means that specific features, structures, materials or characteristics described in connection with the embodiment or example are included in at least one embodiment or example of the present disclosure. In this specification, schematic representation of the above terms is not necessarily directed to the same embodiment or example. Moreover, the specific features, structures, materials or characteristics described may be combined in a suitable manner in any one or more embodiments or examples. In addition, those skilled in the art may combine different embodiments or examples described in this specification and characteristics of the different embodiments or examples without mutual contradiction.

Although the embodiments of the present disclosure are illustrated above, it should be understood that the above embodiments are merely illustrative and may not be construed as limiting the scope of the present disclosure. Changes, modifications, substitutions and variations may be made to the above embodiments by a person of ordinary skill in the art within the scope of the present disclosure.

What is claimed is:

1. An expandable cart, wherein the expandable cart comprises a lifting mechanism, a first folding mechanism, a second folding mechanism, a third folding mechanism, a fourth folding mechanism, and a bottom support mechanism;
the lifting mechanism comprises a first telescopic column, a second telescopic column, a third telescopic column, and a fourth telescopic column arranged vertically and capable of telescoping;
the first telescopic column, the second telescopic column, the third telescopic column, and the fourth telescopic column are rectangularly arranged at intervals, and the first folding mechanism, the second folding mechanism, the third folding mechanism, and the fourth folding mechanism are sequentially connected between two adjacent telescopic columns;
the first telescopic column, the second telescopic column, the third telescopic column, the fourth telescopic column, the third folding mechanism, and the fourth folding mechanism are connected to the bottom support mechanism, and the bottom support mechanism is capable of being folded upward; and
the first folding mechanism, the second folding mechanism, the third folding mechanism, and the fourth folding mechanism are capable of being folded and contracted;

the first telescopic column, the second telescopic column, the third telescopic column, and the fourth telescopic column each comprise a fixed link, a riser tube, and a limiting mechanism;

the fixed link and the riser tube are arranged vertically, and the riser tube is slidably sleeved in the fixed link and located above the fixed link;

the first folding mechanism, the second folding mechanism, the third folding mechanism, and the fourth folding mechanism are connected to the fixed links of the corresponding telescopic columns;

the limiting mechanism comprises a sliding inner plug and an adjustment clamp spring;

the adjustment clamp spring is disposed in the riser tube and provided with a limiting column, a first through hole is formed in the riser tube, and the limiting column is sleeved in the first through hole; and a plurality of second through holes are axially formed at intervals in the fixed link, and the limiting column is capable of passing through the first through hole and any one of the plurality of second through holes at the same time.

2. The expandable cart according to claim 1, wherein heights of the bottom support mechanism, the first folding mechanism, the second folding mechanism, the third folding mechanism, and the fourth folding mechanism after being folded and contracted are smaller than or equal to a minimum height of the lifting mechanism after being contracted.

3. The expandable cart according to claim 2, wherein the third folding mechanism and the fourth folding mechanism each comprise a first scissor linkage assembly, a second scissor linkage assembly, and a third scissor linkage assembly hinged in sequence, and the first scissor linkage assembly, the second scissor linkage assembly, and the third scissor linkage assembly each comprise two rotatably connected linkages;

first ends of first linkages of the first scissor linkage assemblies of the third folding mechanism and the fourth folding mechanism are slidably connected to the first telescopic column and the second telescopic column in one-to-one correspondence;

first ends of second linkages of the first scissor linkage assemblies of the third folding mechanism and the fourth folding mechanism are rotatably connected to the first telescopic column and the second telescopic column in one-to-one correspondence;

first ends of first linkages of the third scissor linkage assemblies of the third folding mechanism and the fourth folding mechanism are slidably connected to the third telescopic column and the fourth telescopic column in one-to-one correspondence; and first ends of second linkages of the third scissor linkage assemblies of the third folding mechanism and the fourth folding mechanism are rotatably connected to the third telescopic column and the fourth telescopic column in one-to-one correspondence.

4. The expandable cart according to claim 2, wherein the expandable cart further comprises a handle mechanism;

the handle mechanism comprises a telescopic pull rod, a first cross bar, a second cross bar, and a pull ring;

the first cross bar is provided with a first end rotatably connected to a bar body of the first telescopic column and a second end rotatably connected to a first end of the telescopic pull rod, and the first cross bar is capable of rotating vertically downward only with a connection point between the first end of the first cross bar and the bar body of the first telescopic column as a rotation center;

the second cross bar is provided with a first end rotatably connected to a bar body of the second telescopic column and a second end rotatably connected to the first end of the telescopic pull rod, and the second cross bar is capable of rotating vertically downward only with a connection point between the first end of the second cross bar and the bar body of the second telescopic column as the rotation center;

a second end of the telescopic pull rod is connected to the pull ring; and a height of the handle mechanism after being contracted is smaller than or equal to the minimum height of the lifting mechanism after being contracted.

5. The expandable cart according to claim 2, wherein the expandable cart further comprises rollers, and top foot fasteners;

the top foot fasteners are respectively disposed at upper ends of the first telescopic column, the second telescopic column, the third telescopic column, and the fourth telescopic column; and the rollers are respectively disposed at lower ends of the first telescopic column, the second telescopic column, the third telescopic column, and the fourth telescopic column.

6. The expandable cart according to claim 1, wherein the third folding mechanism and the fourth folding mechanism each comprise a first scissor linkage assembly, a second scissor linkage assembly, and a third scissor linkage assembly hinged in sequence, and the first scissor linkage assembly, the second scissor linkage assembly, and the third scissor linkage assembly each comprise two rotatably connected linkages;

first ends of first linkages of the first scissor linkage assemblies of the third folding mechanism and the fourth folding mechanism are slidably connected to the first telescopic column and the second telescopic column in one-to-one correspondence;

first ends of second linkages of the first scissor linkage assemblies of the third folding mechanism and the fourth folding mechanism are rotatably connected to the first telescopic column and the second telescopic column in one-to-one correspondence;

first ends of first linkages of the third scissor linkage assemblies of the third folding mechanism and the fourth folding mechanism are slidably connected to the third telescopic column and the fourth telescopic column in one-to-one correspondence; and first ends of second linkages of the third scissor linkage assemblies of the third folding mechanism and the fourth folding mechanism are rotatably connected to the third telescopic column and the fourth telescopic column in one-to-one correspondence.

7. The expandable cart according to claim 6, wherein slide sleeves are slidably sleeved on the first telescopic column, the second telescopic column, the third telescopic column, and the fourth telescopic column, respectively; and the first ends of the first linkages of the first scissor linkage assembly and the third scissor linkage assembly are rotatably connected to the slide sleeves.

8. The expandable cart according to claim 1, wherein the expandable cart further comprises a handle mechanism;

the handle mechanism comprises a telescopic pull rod, a first cross bar, a second cross bar, and a pull ring;

the first cross bar is provided with a first end rotatably connected to a bar body of the first telescopic column and a second end rotatably connected to a first end of the telescopic pull rod, and the first cross bar is capable of rotating vertically downward only with a connection point between the first end of the first cross bar and the bar body of the first telescopic column as a rotation center;

the second cross bar is provided with a first end rotatably connected to a bar body of the second telescopic column and a second end rotatably connected to the first end of the telescopic pull rod, and the second cross bar is capable of rotating vertically downward only with a connection point between the first end of the second cross bar and the bar body of the second telescopic column as the rotation center;

a second end of the telescopic pull rod is connected to the pull ring; and a height of the handle mechanism after being contracted is smaller than or equal to a minimum height of the lifting mechanism after being contracted.

9. The expandable cart according to claim 1, wherein the expandable cart further comprises rollers, and top foot fasteners;

the top foot fasteners are respectively disposed at upper ends of the first telescopic column, the second telescopic column, the third telescopic column, and the fourth telescopic column; and the rollers are respectively disposed at lower ends of the first telescopic column, the second telescopic column, the third telescopic column, and the fourth telescopic column.

10. An expandable cart, wherein the expandable cart comprises a lifting mechanism, a first folding mechanism, a second folding mechanism, a third folding mechanism, a fourth folding mechanism, and a bottom support mechanism;

the lifting mechanism comprises a first telescopic column, a second telescopic column, a third telescopic column, and a fourth telescopic column arranged vertically and capable of telescoping;

the first telescopic column, the second telescopic column, the third telescopic column, and the fourth telescopic column are rectangularly arranged at intervals, and the first folding mechanism, the second folding mechanism, the third folding mechanism, and the fourth folding mechanism are sequentially connected between two adjacent telescopic columns;

the first telescopic column, the second telescopic column, the third telescopic column, the fourth telescopic column, the third folding mechanism, and the fourth folding mechanism are connected to the bottom support mechanism, and the bottom support mechanism is capable of being folded upward;

the first folding mechanism, the second folding mechanism, the third folding mechanism, and the fourth folding mechanism are capable of being folded and contracted;

the third folding mechanism and the fourth folding mechanism each comprise a first scissor linkage assembly, a second scissor linkage assembly, and a third scissor linkage assembly hinged in sequence, and the first scissor linkage assembly, the second scissor linkage assembly, and the third scissor linkage assembly each comprise two rotatably connected linkages;

first ends of first linkages of the first scissor linkage assemblies of the third folding mechanism and the fourth folding mechanism are slidably connected to the first telescopic column and the second telescopic column in one-to-one correspondence;

first ends of second linkages of the first scissor linkage assemblies of the third folding mechanism and the fourth folding mechanism are rotatably connected to the first telescopic column and the second telescopic column in one-to-one correspondence;

first ends of first linkages of the third scissor linkage assemblies of the third folding mechanism and the fourth folding mechanism are slidably connected to the third telescopic column and the fourth telescopic column in one-to-one correspondence;

first ends of second linkages of the third scissor linkage assemblies of the third folding mechanism and the fourth folding mechanism are rotatably connected to the third telescopic column and the fourth telescopic column in one-to-one correspondence;

a distance between second ends of the two linkages of each of the first scissor linkage assembly and the third scissor linkage assembly is smaller than a distance between the first ends thereof;

the second ends of the two linkages of the first scissor linkage assembly are bent toward a horizontal axis of symmetry of the first scissor linkage assembly;

the second ends of the two linkages of the third scissor linkage assembly are bent toward a horizontal axis of symmetry of the third scissor linkage assembly; and two ends of each of the two linkages of the second scissor linkage assembly are bent toward a horizontal axis of symmetry of the second scissor linkage assembly, and a distance between first ends of the two linkages of the second scissor linkage assembly is equal to a distance between second ends thereof.

11. An expandable cart, wherein the expandable cart comprises a lifting mechanism, a first folding mechanism, a second folding mechanism, a third folding mechanism, a fourth folding mechanism, and a bottom support mechanism;

the lifting mechanism comprises a first telescopic column, a second telescopic column, a third telescopic column, and a fourth telescopic column arranged vertically and capable of telescoping;

the first telescopic column, the second telescopic column, the third telescopic column, and the fourth telescopic column are rectangularly arranged at intervals, and the first folding mechanism, the second folding mechanism, the third folding mechanism, and the fourth folding mechanism are sequentially connected between two adjacent telescopic columns;

the first telescopic column, the second telescopic column, the third telescopic column, the fourth telescopic column, the third folding mechanism, and the fourth folding mechanism are connected to the bottom support mechanism, and the bottom support mechanism is capable of being folded upward;

the first folding mechanism, the second folding mechanism, the third folding mechanism, and the fourth folding mechanism are capable of being folded and contracted;

the third folding mechanism and the fourth folding mechanism each comprise a first scissor linkage assembly, a second scissor linkage assembly, and a third scissor linkage assembly hinged in sequence, and the first scissor linkage assembly, the second scissor linkage assembly, and the third scissor linkage assembly each comprise two rotatably connected linkages;

first ends of first linkages of the first scissor linkage assemblies of the third folding mechanism and the fourth folding mechanism are slidably connected to the first telescopic column and the second telescopic column in one-to-one correspondence;

first ends of second linkages of the first scissor linkage assemblies of the third folding mechanism and the fourth folding mechanism are rotatably connected to the first telescopic column and the second telescopic column in one-to-one correspondence;

first ends of first linkages of the third scissor linkage assemblies of the third folding mechanism and the fourth folding mechanism are slidably connected to the third telescopic column and the fourth telescopic column in one-to-one correspondence;

first ends of second linkages of the third scissor linkage assemblies of the third folding mechanism and the fourth folding mechanism are rotatably connected to the third telescopic column and the fourth telescopic column in one-to-one correspondence; and middle hinged joints of two sides of the bottom support mechanism are respectively hinged to junctions of the second scissor linkage assemblies of the third folding mechanism and the fourth folding mechanism by means of a first hanger rod and a second hanger rod, and a height of the bottom support mechanism after being folded upward is smaller than or equal to a minimum height of the lifting mechanism after being contracted.

12. The expandable cart according to claim 11, wherein the bottom support mechanism comprises a first connector, a second connector, a third connector, a fourth connector, a first fulcrum bar, a second fulcrum bar, a third fulcrum bar, a fourth fulcrum bar, a fifth fulcrum bar, a sixth fulcrum bar, a seventh fulcrum bar, and an eighth fulcrum bar;

first ends of the first fulcrum bar, the second fulcrum bar, the third fulcrum bar, and the fourth fulcrum bar are rotatably connected to the first connector, and first ends of the fifth fulcrum bar, the sixth fulcrum bar, the seventh fulcrum bar, and the eighth fulcrum bar are rotatably connected to the second connector;

a second end of the first fulcrum bar is rotatably connected to a bar body of the first telescopic column, a second end of the second fulcrum bar is rotatably connected to a bar body of the second telescopic column, a second end of the fifth fulcrum bar is rotatably connected to a bar body of the third telescopic column, and a second end of the sixth fulcrum bar is rotatably connected to a bar body of the fourth telescopic column;

second ends of the third fulcrum bar and the seventh fulcrum bar are rotatably connected to the third connector, and second ends of the fourth fulcrum bar and the eighth fulcrum bar are rotatably connected to the fourth connector;

the first fulcrum bar, the second fulcrum bar, the fifth fulcrum bar, and the sixth fulcrum bar have a same length, the third fulcrum bar, the fourth fulcrum bar, the seventh fulcrum bar, and the eighth fulcrum bar have a same length, the first fulcrum bar is longer than the third fulcrum bar, and when the bottom support mechanism is folded upward, the first connector and the second connector are close to a center of the expandable cart; and the first hanger rod is slidably connected to the third connector, and the second hanger rod is slidably connected to the fourth connector.

\* \* \* \* \*